(12) United States Patent
Li

(10) Patent No.: US 12,001,450 B2
(45) Date of Patent: Jun. 4, 2024

(54) DISTRIBUTED TABLE STORAGE PROCESSING METHOD, DEVICE AND SYSTEM

(71) Applicants: BEIJING KINGSOFT CLOUD NETWORK TECHNOLOGY CO., LTD., Beijing (CN); BEIJING KINGSOFT CLOUD TECHNOLOGY CO., LTD., Beijing (CN)

(72) Inventor: Haibing Li, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO, LTD., Beijing (CN)

( * ) Notice: Subject to any disclaimer, the term of this patent is extended or adjusted under 35 U.S.C. 154(b) by 114 days.

(21) Appl. No.: 17/756,151

(22) PCT Filed: Nov. 10, 2020

(86) PCT No.: PCT/CN2020/127868
§ 371 (c)(1),
(2) Date: May 18, 2022

(87) PCT Pub. No.: WO2021/098555
PCT Pub. Date: May 27, 2021

(65) Prior Publication Data
US 2023/0030856 A1 Feb. 2, 2023

(30) Foreign Application Priority Data
Nov. 22, 2019 (CN) .......................... 201911156377.5

(51) Int. Cl.
*G06F 16/27* (2019.01)
*G06F 16/22* (2019.01)
*G06F 16/23* (2019.01)

(52) U.S. Cl.
CPC .......... *G06F 16/27* (2019.01); *G06F 16/2282* (2019.01); *G06F 16/2358* (2019.01)

(58) Field of Classification Search
CPC .. G06F 16/27; G06F 16/2282; G06F 16/2358; G06F 3/0617; G06F 3/0659;
(Continued)

(56) References Cited

U.S. PATENT DOCUMENTS

| 10,798,168 B2* | 10/2020 | Yang .................... G06F 11/2023 |
| 2014/0279920 A1* | 9/2014 | Madhavarapu ......... G06F 16/21 707/649 |

(Continued)

FOREIGN PATENT DOCUMENTS

| CN | 103580906 | 2/2014 |
| CN | 104933132 | 9/2015 |

(Continued)

OTHER PUBLICATIONS

International Search Report and Written Opinion issued in Corresponding PCT Application No. PCT/CN2020/127868, dated Feb. 18, 2021 (English translation provided).

(Continued)

*Primary Examiner* — Albert M Phillips, III
(74) *Attorney, Agent, or Firm* — NORTON ROSE FULBRIGHT US LLP

(57) ABSTRACT

A distributed table storage processing method, device and system, a master server to which a to-be-split slice belongs generates a splitting log of the to-be-split slice and a serial number of the splitting log after receiving a first splitting instruction for the to-be-split slice sent by a control device;

(Continued)

sends the splitting log and serial number of the splitting log to a slave server to which the to-be-split slice belongs, and the slave server sends a first acknowledgment message to the master server after storing the splitting log and the serial number; performs splitting storage on the to-be-split slice according to the splitting log to obtain a plurality of new slices when the number of the received first acknowledgment messages is not less than a first threshold; sends a second splitting instruction to each slave server, and the slave server performs splitting storage to obtain a plurality of new slices.

11 Claims, 4 Drawing Sheets

(58) Field of Classification Search
CPC ... G06F 3/067; G06F 16/278; H04L 67/1097; Y02D 10/00
See application file for complete search history.

(56) References Cited

U.S. PATENT DOCUMENTS

| | | | |
|---|---|---|---|
| 2014/0330785 A1 | 11/2014 | Isherwood et al. | |
| 2015/0378830 A1* | 12/2015 | Hoobler, III | G06F 11/1458 |
| | | | 707/648 |
| 2016/0188426 A1 | 6/2016 | Kousha et al. | |
| 2017/0177628 A1* | 6/2017 | Zhang | G06F 16/273 |
| 2018/0150501 A1* | 5/2018 | Hattori | G06F 16/2358 |
| 2018/0365235 A1 | 12/2018 | Kousha et al. | |
| 2019/0340011 A1* | 11/2019 | Raman | G06F 9/466 |
| 2020/0349035 A1* | 11/2020 | Upadhyay | G06F 16/182 |

FOREIGN PATENT DOCUMENTS

| | | |
|---|---|---|
| CN | 105468718 | 4/2016 |
| CN | 106897281 | 6/2017 |
| CN | 106991113 | 7/2017 |
| CN | 108345617 | 7/2018 |
| CN | 109284073 | 1/2019 |
| CN | 109753511 | 5/2019 |
| CN | 110169040 | 8/2019 |
| JP | 2013008291 | 1/2013 |

OTHER PUBLICATIONS

Notice of Allowance issued in corresponding Chinese Application No. 201911156377.5, dated Jul. 21, 2023.

* cited by examiner

DISTRIBUTED TABLE STORAGE PROCESSING METHOD, DEVICE AND SYSTEM

CROSS REFERENCE TO RELATED APPLICATIONS

The present application is a national phase application under 35 U.S.C. § 371 of International Application No. PCT/CN2020/127868, filed Nov. 10, 2020, which claims the benefit of priority to Chinese patent application No. 201911156377.5, filed in China National Intellectual Property Administration on Nov. 22, 2019, and entitled "Distributed table storage processing method, device and system", each of which are incorporated herein by reference in their entirety.

TECHNICAL FIELD

The present application relates to the technical field of distributed storage, in particular to a distributed table storage processing method, device and system.

BACKGROUND

With the rapid development of information technology, the amount of data in distributed storage system is increasing. In order to meet the storage requirements for large amount of data, distributed storage systems running on multiple servers have been widely used.

In a distributed storage system, to-be-stored data is usually divided into multiple slices horizontally by means of slice storage, and then each of the slices is stored separately.

In order to ensure the high availability of data and services, it is often necessary to provide the necessary fault-tolerant mechanism for the distributed storage systems, perform redundant backups on each of the slices, generate multiple slice copies corresponding to the same slice, and store the generated slice copies on different servers, thereby avoiding the occurrence of slice loss, storage services unavailability due to the unavailability of a single server.

In practical application, with the increase of the amount of data of the slices and/or the pressure of requesting slices in the distributed storage system, the original slices will not provide sufficient service capacity, and the original slices should be split to obtain multiple new slices, which then are stored separately.

However, in the distributed storage system, since multiple slice copies corresponding to the same slice are stored on multiple different servers separately, therefore, in order to make the new slices formed by each of the slice copies the same, it is necessary to split each of the slice copies at the same time in case that multiple slice copies are completely the same, which results in low availability of the distributed storage system.

SUMMARY

The purpose of the embodiments of the present application is to provide a distributed table storage processing method, device and system, so as to improve the availability of the distributed storage system. The specific technical solutions are as follows:

The embodiments of the present application provides a distributed table storage processing method, which is applied to a master server to which a to-be-split slice belongs, the method includes: generating a splitting log of the to-be-split slice and a serial number of the splitting log after receiving a first splitting instruction for the to-be-split slice sent by a control device; sending the splitting log and the serial number of the splitting log to each slave server to which the to-be-split slice belongs, so that each slave server sends a first acknowledgment message which includes the serial number of the splitting log to the master server after storing the splitting log and the serial number of the splitting log; performing splitting storage on the to-be-split slice according to the splitting log to obtain a plurality of new slices when the number of the received first acknowledgment messages is not less than a first threshold; sending a second splitting instruction which includes the serial number of the splitting log to each slave server, so that each slave server performs splitting storage on the to-be-split slice according to the splitting log to obtain the plurality of new slices after receiving the second splitting instruction.

The embodiment of the present application further provides a distributed table storage processing method, which is applied to a slave server to which a to-be-split slice belongs, the method includes: receiving a splitting log of the to-be-split slice and a serial number of the splitting log sent by a master server to which the to-be-split slice belongs, wherein the splitting log and the serial number of the splitting log are generated by the master server after receiving a first splitting instruction for the to-be-split slice sent by a control device; storing the splitting log and the serial number of the splitting log, and sending a first acknowledgment message which includes the serial number of the splitting log to the master server after successful storage, so that the master server performs splitting storage on the to-be-split slice according to the splitting log to obtain a plurality of new slices when the number of the received first acknowledgment messages is not less than a first threshold, and sends a second splitting instruction to the slave server; performing splitting storage on the to-be-split slice according to the splitting log to obtain the plurality of new slices after receiving the second splitting instruction which includes the serial number of the splitting log.

The embodiment of the present application further provides a distributed table storage processing device, which is applied to a master server to which a to-be-split slice belongs, and the device comprises: a generation module configured to generate a splitting log of the to-be-split slice and a serial number of the splitting log after receiving a first splitting instruction for the to-be-split slice sent by a control device; a first sending module configured to send the splitting log and the serial number of the splitting log to each slave server to which the to-be-split slice belongs, so that each slave server sends a first acknowledgment message which includes the serial number of the splitting log to the master server after storing the splitting log and the serial number of the splitting log; a splitting module configured to perform splitting storage on the to-be-split slice according to the splitting log to obtain a plurality of new slices when the number of the received first acknowledgment messages is not less than a first threshold; a second sending module configured to send a second splitting instruction which includes the serial number of the splitting log to each slave server so that each slave server performs splitting storage on the to-be-split slice according to the splitting log to obtain the plurality of new slices after receiving the second splitting instruction.

The embodiment of the present application further provides a distributed table storage processing device, which is applied to a slave server to which a to-be-split slice belongs, and the device comprises: a receiving module configured to receive a splitting log of the to-be-split slice and a serial number of the splitting log sent by a master server to which the to-be-split slice belongs, wherein the splitting log and the serial number of splitting log are generated by the master server after receiving a first splitting instruction for the to-be-split slice sent by a control device; a storage module configured to store the splitting log and the serial number of the splitting log, and send a first acknowledgment message which includes the serial number of the splitting log to the master server after successful storage, so that the master server performs splitting storage on the to-be-split slice according to the splitting log to obtain a plurality of new slices when the number of the received first acknowledgment messages is not less than a first threshold, and sends a first second splitting instruction to the slave server; and a splitting module configured to perform splitting storage on the to-be-split slice according to the splitting log to obtain a plurality of new slices after receiving the second splitting instruction which includes the serial number of the splitting log.

The embodiment of the present application further provides a distributed table storage processing system, which comprises: a control device configured to monitor data amount of each of slices, use the slices with the data amount not less than a preset data amount as the to-be-split slices, and send a first splitting instruction for the to-be-split slice to the master server to which the to-be-split slice belongs; the master server configured to generate a splitting log of the to-be-split slice and a serial number of the splitting log after receiving the first splitting instruction; send the splitting log and the serial number of the splitting log to each slave server to which the to-be-split slice belongs; the slave server configured to send a first acknowledgment message which includes the serial number of the splitting log to the master server after receiving and storing the splitting log and the serial number of the splitting log; the master server is further configured to perform splitting storage on the to-be-split slice according to the splitting log to obtain a plurality of new slices when the number of the received first acknowledgment messages is not less than a first threshold; send a second splitting instruction which includes the serial number of the splitting log to each slave server; and the slave server is further configured to perform splitting storage on the to-be-split slice according to the splitting log to obtain the plurality of new slices after receiving the second splitting instruction.

The embodiment of the present application further provides an electronic device, which comprises a processor, a communication interface, a memory and a communication bus, wherein the processor, the communication interface and the memory communicate with each other through the communication bus; the memory is configured to store a computer program; and the processor is configured to implement any of the processing methods for distributed table storage mentioned above when executing the program stored on the memory.

The embodiment of the present application further provides a computer readable storage medium, the computer readable storage medium stores a computer program thereon which, when executed by a processor, causes the processor to implement any above-mentioned distributed table storage processing method.

The embodiment of the present application further provides a computer program product containing instructions which, when running on a computer, causes the computer to implement any above-mentioned distributed table storage processing method.

In the distributed table storage processing method, device and system provided by this embodiment of the present application, the master server to which the to-be-split slice belongs generates a splitting log of a to-be-split slice and a serial number of the splitting log after receiving a first splitting instruction for the to-be-split slice sent by the control device; sends the splitting log and the serial number of the splitting log to each slave server to which the to-be-split slice belongs, so that each slave server sends a first acknowledgment message which includes the serial number of the splitting log to the master server after storing the splitting log and the serial number of the splitting log; performs splitting storage on the to-be-split slice according to the splitting log to obtain a plurality of new slices when the number of the received first acknowledgment messages is not less than a first threshold; sends a second splitting instruction which includes the serial number of the splitting log to each slave server, so that each slave server performs splitting storage on the to-be-split slice according to the splitting log to obtain a plurality of new slices after receiving the second splitting instruction. In such way, in case that both the master server and the slave server execute the same splitting log according to the sequence number, even if the master server and the slave server do not perform splitting storage on the to-be-split slice at the same time, the obtained new slices are the same, thus improving the availability of the distributed storage system. Of course, it is not necessary to achieve all the advantages described above at the same time to implement any product or method of the present application.

BRIEF DESCRIPTION OF THE DRAWINGS

In order to explain the embodiments of the present application and the technical solution of related technologies more clearly, the drawings needed in the embodiments and related technologies are briefly introduced bellow. Obviously, the drawings in the following description are only some embodiments of the present application. For the skilled in the art, other drawings can be obtained according to these drawings without creative efforts.

DETAILED DESCRIPTION

In order to make the purpose, technical solution and advantages of the present application clearer, the present application will be further described in detail with reference to the attached drawings and examples. Obviously, the described embodiments are only a part of the embodiments of the present application, but not all the embodiments. Based on the embodiments in the present application, all other embodiments obtained by those of ordinary skill in the art without creative efforts shall fall within the protection scope of the present application.

In a distributed storage system, multiple slice copies corresponding to the same slice are stored on multiple different servers. Therefore, in order to make the new slices formed by the splitting of each of the slice copies the same, it is necessary to split each of the slice copies at the same time in case that multiple slice copies are completely the same, which results in low availability of the distributed storage system. In order to solve the above technical problems, the present application provides a distributed table storage processing method, device and system, the solution provided by the embodiment of the present application will be described in general in the following.

Figure 1:
FIG. 1 is a schematic structural diagram of a distributed table storage processing system provided by an embodiment of the present application.

As shown in FIG. 1, it is a structural schematic diagram of a distributed table storage processing system provided in an embodiment of the present application, the distributed table storage processing system includes a control device, a master server and a slave server, wherein the distributed table storage processing system may be KTS (Kingsoft Table Service), and the master server and slave server may be servers in KTS. KTS is a fully hosted NoSQL (Not Only SQL) database service, which provides storage and real-time access to massive structured and semi-structured data.

In the embodiment of the present application, the master server and the slave server are for the same to-be-split slice, and the to-be-split slice is the to-be-split slice and stored. One server may be the master server to which one to-be-split slice belongs, and may be the slave server of another slice at the same time.

The distributed table storage processing method provided by the embodiment of the present application may be applied to a master server to which a to-be-split slice belongs, and the method includes: generating a splitting log of the to-be-split slice and a serial number of the splitting log after receiving a first splitting instruction for the to-be-split slice sent by a control device; sending the splitting log and the serial number of the splitting log to each slave server to which the to-be-split slice belongs, so that each slave server sends a first acknowledgment message which includes the serial number of the splitting log to the master server after storing the splitting log and the serial number of the splitting log; performing splitting storage on the to-be-split slice according to the splitting log to obtain a plurality of new slices when the number of the received first acknowledgment messages is not less than a first threshold; sending a second splitting instruction which includes the serial number of the splitting log to each slave server, so that each slave server performs splitting storage on the to-be-split slice according to the splitting log to obtain a plurality of new slices after receiving the second splitting instruction.

It may be seen from the above that in the distributed table storage processing method provided by the embodiment of the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 2:
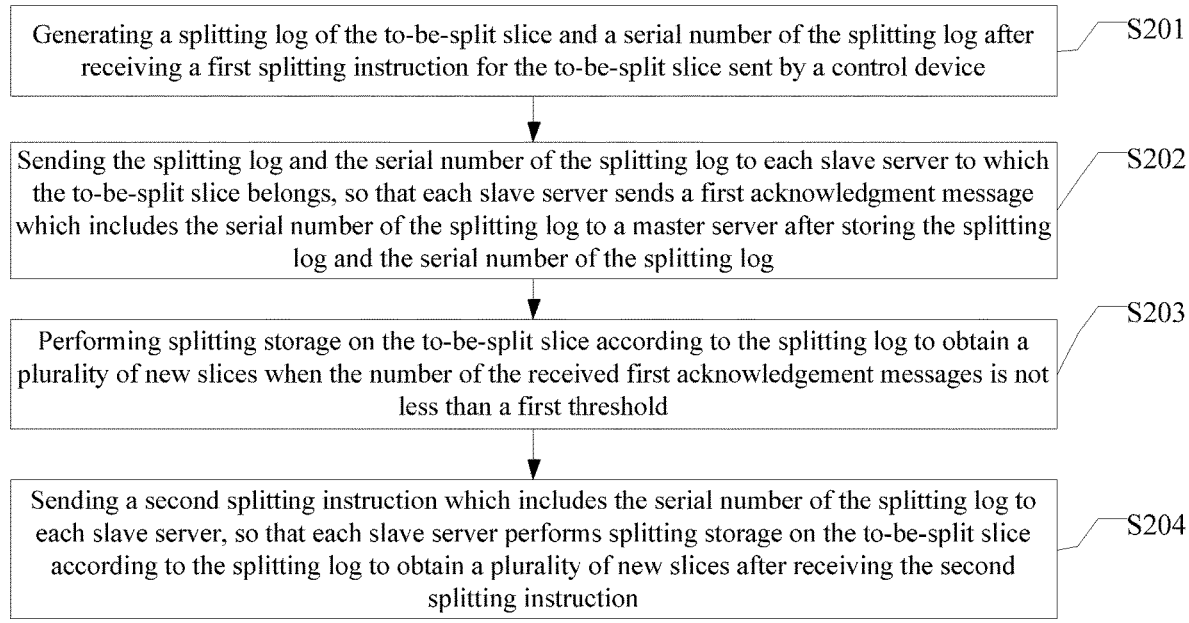
FIG. 2 is a flowchart of a distributed table storage processing method applied to a master server provided by an embodiment of the present application.

The distributed table storage processing method provided by the embodiment of the present application will be described in detail by means of the following specific embodiments. As shown in FIG. 2, it is a flow chart of a distributed table storage processing method applied to a master server to which a to-be-split slice belongs provided by an embodiment of the present application, which includes the following steps:

S201: generating a splitting log of the to-be-split slice and a serial number of the splitting log after receiving a first splitting instruction for the to-be-split slice sent by a control device.

In this embodiment of the present application, the control device in the distributed table storage processing system may monitor the data amount of each of slices in the distributed table storage processing system, and determine the slice needs to be split and stored as the to-be-split slice according to the data amount of the slice.

In one implementation, the control device may take a slice with a data amount not less than a preset data amount as a to-be-split slice, and then send a first splitting instruction for the to-be-split slice to the master server to which the to-be-split slice belongs. Alternatively, the control device may further generate the first splitting instruction after receiving a splitting storage request sent by a user. The first splitting instruction contains identification information of a to-be-split slice, which may be either the name of the to-be-split slice or the ID (Identification) of the to-be-split slice.

The master server to which the to-be-split slice belongs generates the splitting log of the to-be-split slice and the serial number of the splitting log after receiving the first splitting instruction. In one implementation, the generated splitting log and the serial number of the splitting log may be serially written into the log file together with other logs according to the time sequence of log generation. Among them, each log generated by the master server has a unique serial number corresponding to the log, and the serial number of each log keeps increasing as the extension of the generation time of the log.

S202: sending the splitting log and the serial number of the splitting log to each slave server to which the to-be-split slice belongs, so that each slave server sends a first acknowledgment message which includes the serial number of the splitting log to a master server after storing the splitting log and the serial number of the splitting log.

After the master server to which the to-be-split slice belongs generates the splitting log of the to-be-split slice and the serial number of the splitting log, the splitting log and the serial number of the splitting log may be sent to each slave server to which the to-be-split slice belongs.

In one implementation, the master server may analyze the to-be-split slice according to the preset splitting rules to obtain data splitting points of the to-be-split slices, and then generate a splitting log carrying the data splitting points, in this way, each slave server may read the splitting log and split the to-be-split slice according to the data splitting points to obtain new slices which are the same as those of the master server.

Alternatively, in another implementation, a same data splitting rule may be preset in the master server and the slave servers to which the to-be-split slice belongs, and each slave server may split the to-be-split slice according to a preset data splitting rule after reading the splitting log, so as to obtain new slices which are the same as those of the master server, in this way, in the splitting log, only instructions for splitting the to-be-split slice are included, without carrying specific data splitting points, thus reducing the data amount of communication between the master server and the slave servers to which to-be-split slice belongs.

S203: performing splitting storage on the to-be-split slice according to the splitting log to obtain a plurality of new slices when the number of the received first acknowledgement messages is not less than a first threshold.

In order to ensure the consistency of splitting storage of the to-be-split slices between the master server and the slave server, the master server may perform splitting storage on the to-be-split slice when the number of the received first acknowledgement messages is not less than the first threshold.

Wherein, the number of the first acknowledgement messages received by the master server is the number of slave servers that have stored splitting logs and the serial numbers of the splitting logs, that is to say, if the number of first acknowledgement messages received by the master server is not less than the first threshold, it means that the number of slave servers that have stored splitting logs and the serial numbers of the splitting logs is not less than the first threshold. In other words, most of the current slave servers have stored the splitting logs and the serial numbers of the splitting logs. In this case, the master server will execute the subsequent steps, so as to ensure as possible that each slave server has stored the splitting log, and then ensure the data consistency of the to-be-split slices after splitting storage in different servers.

Wherein, the embodiment of the present application does not specifically limit the size of the first threshold, for example, the first threshold may be half of the number of slave servers. For example, if the number of slave servers is 5, and the first threshold may be 4, the master server will continue to wait after receiving 1 first acknowledgement message until the master server receives 4 first acknowledgement messages, which indicates that 4 slave servers have stored the splitting log and the serial number of the splitting log, and then subsequent operations are performed.

In this embodiment of the present application, the master server executes each of logs in sequence according to the serial number of the log, that is to say, when the number of the first acknowledgement messages received by the master server is not less than the first threshold, splitting storage on the to-be-split slice may not be performed immediately, and the splitting storage on the to-be-split slice may be performed after the last log of the splitting log is executed.

In one implementation, when the master server performs splitting storage on the to-be-split slice, it may perform splitting storage on the to-be-split slice according to the data splitting points in the splitting log to obtain multiple new slices, alternatively, it may perform splitting storage on the to-be-split slice according to a pre-stored data splitting rule to obtain multiple new slices. The new slices mentioned here are the slices obtained after performing splitting storage of the to-be-split slices.

S204: sending a second splitting instruction which includes the serial number of the splitting log to each slave server, so that each slave server performs splitting storage on the to-be-split slice according to the splitting log to obtain a plurality of new slices after receiving the second splitting instruction.

After the master server completes performing splitting storage on the to-be-split slice to obtain a plurality of new slices, it may send a second splitting instruction to each slave server. After receiving the second splitting instruction, the slave server may determine that the splitting log corresponding to the serial number may be executed according to the serial number of the splitting log included in the second splitting instruction.

Furthermore, the slave server may perform splitting storage on the to-be-split slice according to the splitting log to obtain a plurality of new slices, which are the same as those obtained by the master server, and the specific splitting storage mode is the same as that of the master server for the to-be-split slice, which will not repeated here.

In this embodiment of the present application, the slave server executes each of logs in sequence according to the serial number of the log, that is to say, when the second splitting instruction is received from the server, splitting storage on the to-be-split slice may not be performed immediately, and the splitting storage on the to-be-split slice may be performed after the last log of the splitting log is executed.

In one implementation, the master server may further generate a data log of the to-be-split slice and the serial number of the data log after receiving a first write instruction for the to-be-split slice sent by the agent node. Wherein, the data log and the splitting log both belong to a part of a to-be-executed log file. The agent node may be a process for forwarding instructions input by a user.

Then, the master server may send the data log and the serial number of the data log to each slave server to which the to-be-split slice belongs, so that each slave server may send a second acknowledgment message which includes the serial number of the data log to the master server after storing the data log and the serial number of the data log.

Furthermore, the master server may acquire and store to-be-written data according to the data log when the number of the received second acknowledgement messages is not less than a second threshold, and then send a second write instruction which includes the serial number of the data log to each slave server, so that each slave server acquires and stores the to-be-written data according to the data log after receiving the second write instruction. The to-be-written data may be stored in the local database of the master server or the slave server.

Alternatively, the log file may further include other types of logs, and the master server and the slave server will perform different operations according to different logs, which will not limited by the embodiment of the present application.

In one implementation, the master server may further send an inquiry instruction to each slave server after sending a second splitting instruction to each slave server, each slave server returns a serial number of a log executed by the slave server last time to the master server after receiving the inquiry instruction, and then, the master server receives the serial number returned by each slave server, and determines that the to-be-split slice has finished the splitting storage when the serial number returned by each slave server last time is not less than the serial number of the splitting log.

It may be seen from the above that in the distributed table storage processing method provided by the embodiment of the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 3:
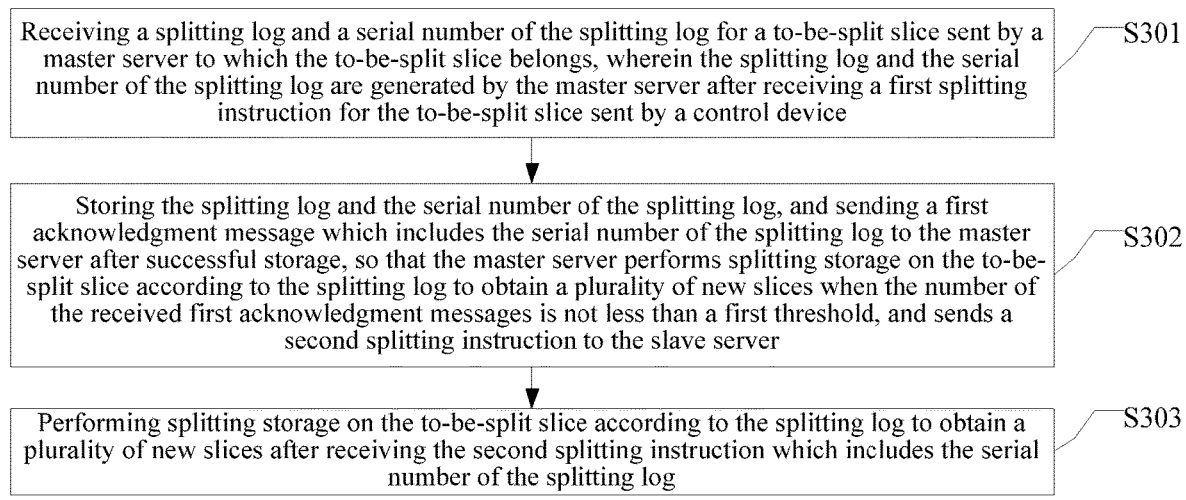
FIG. 3 is a flowchart of a distributed table storage processing method applied to a slave server provided by an embodiment of the present application.

As shown in FIG. 3, correspondingly, it is a flow chart of a distributed table storage processing method applied to the slave server to which the to-be-split slice belongs provided in the embodiment of the present application, which may include the following steps:

S301: receiving a splitting log and a serial number of the splitting log for a to-be-split slice sent by a master server to which the to-be-split slice belongs, wherein the splitting log and the serial number of the splitting log are generated by the master server after receiving a first splitting instruction for the to-be-split slice sent by a control device; S302: storing the splitting log and the serial number of the splitting log, and sending a first acknowledgment message which includes the serial number of the splitting log to the master server after successful storage, so that the master server performs splitting storage on the to-be-split slice according to the splitting log to obtain a plurality of new slices when the number of the received first acknowledgment messages is not less than a first threshold, and sends a second splitting instruction to the slave server; S303: performing splitting storage on the to-be-split slice according to the splitting log to obtain a plurality of new slices after receiving the second splitting instruction which includes the serial number of the splitting log.

In one implementation, the method may further include: receiving a data log of the to-be-split slice and a serial number of the data log sent by a master server to which the to-be-split slice belongs, wherein the data log and the serial number of the data log are generated by the master server after receiving a first write instruction for the to-be-split slice sent by an agent node; storing the data log and the serial number of the data log, and sending a second acknowledgment message which includes the serial number of the data log to the master server after successful storage, so that the master server acquires and stores the to-be-written data according to the data log when the number of the received second acknowledgment messages is not less than a second threshold, and sends a second write instruction to each slave server; acquiring and storing to-be-written data according to the data log after receiving the second writing instruction which includes the serial number of the data log.

In one implementation, the method may further include: receiving an inquiry instruction sent by the master server; returning the serial number of the log executed last time to the master server, so that the master server may determine that the splitting storage on the to-be-split slice has been performed in case that the serial number returned by each slave server last time is not less than the serial number of the splitting log.

It may be seen from the above that in the distributed table storage processing method provided by the present application and the distributed table storage processing method provided by the embodiment of the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 4:
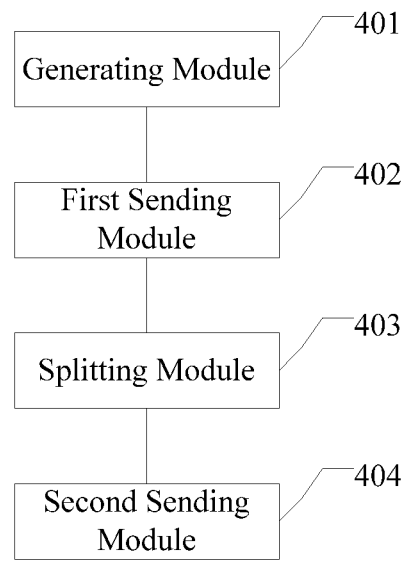
FIG. 4 is a structural diagram of a distributed table storage processing device applied to a master server provided by an embodiment of the present application.

The embodiment of the present application further provides a distributed table storage processing device, which is applied to a master server to which a to-be-split slice belongs, as shown in FIG. 4. the device comprises a generating module 401, which is configured to generate a splitting log of the to-be-split slice and a serial number of the splitting log after receiving a first splitting instruction for the to-be-split slice sent by a control device; a first sending module 402, which is configured to send the splitting log and the serial number of the splitting log to each slave server to which the to-be-split slice belongs, so that each slave server sends a first acknowledgment message which includes the serial number of the splitting log to the master server after storing the splitting log and the serial number of the splitting log; a splitting module 403, which is configured to perform splitting storage on the to-be-split slice according to the splitting log to obtain a plurality of new slices when the number of the received first acknowledgement messages is not less than a first threshold; the second sending module 404, which is configured to send the second splitting instruction which includes the serial number of the splitting log to each slave server, so that each slave server performs splitting storage on the to-be-split slice according to the splitting log to obtain a plurality of new slices after receiving the second splitting instruction.

In one implementation, the generating module 401 is further configured to generate a data log of the to-be-split slice and a serial number of the data log after receiving the first write instruction for the to-be-split slice sent by the agent node; the first sending module 402 is further configured to send the data log and the serial number of the data log to each slave server to which the to-be-split slice belongs, so that each slave server sends a second acknowledgment message which includes the serial number of the data log to the master server after storing the data log and the serial number of the data log; a writing module (not shown in the figure) is configured to acquire and store to-be-written data according to the data log when the number of the received second acknowledgement messages is not less than a second threshold; the second sending module 404 is further configured to send a second write instruction which includes the serial number of the data log to each slave server, so that each slave server may acquire and store the to-be-written data according to the data log after receiving the second write instruction.

In one implementation, the device further includes a query module (not shown in the figure), which is configured to send a query instruction to each slave server, so that each slave server returns a serial number of a log executed by the slave server last time after receiving the query instruction; a determining module (not shown in the figure), which is configured to receive the serial number returned by each slave server, and determine that the splitting storage on the to-be-split slice has been performed in case that the serial number returned by each slave server last time is not less than the serial number of the splitting log.

It may be seen from the above that in the distributed table storage processing device provided by the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 5:
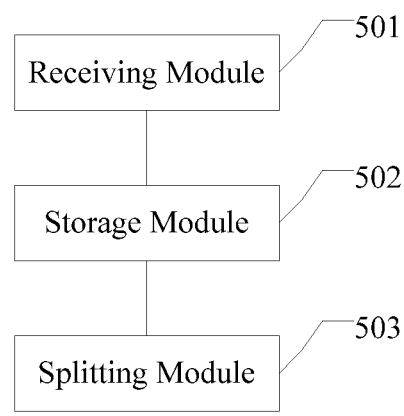
FIG. 5 is a structural diagram of a distributed table storage processing device applied to of a slave server provided by an embodiment of the present application.

The embodiment of the present application further provides a distributed table storage processing device, which is applied to the slave server to which the to-be-split slice belongs. As shown in FIG. 5, the device includes: a receiving module 501, which is configured to receive the splitting log of the to-be-split slice and the serial number of the splitting log sent by the master server to which the to-be-split slice belongs, wherein the splitting log and the serial number of the splitting log are generated by the master server after receiving the first splitting instruction for the to-be-split slice sent by the control device; a storage module 502, which is configured to store the splitting log and the serial number of the splitting log, and send a first acknowledgment message which includes the serial number of the splitting log to the master server after successful storage, so that when the number of the received first acknowledgment messages is not less than a first threshold, the master server performs splitting storage on the to-be-split slice according to the splitting log to obtain a plurality of new slices, and sends a second splitting instruction to the slave server; the splitting module 503, which is configured to perform splitting storage on the to-be-split slice according to the splitting log to obtain a plurality of new slices after receiving the second splitting instruction which includes the serial number of the splitting log.

In one implementation, the receiving module 501 is further configured to receive a data log of the to-be-split slice and a serial number of the data log sent by a master server to which the to-be-split slice belongs, wherein the data log and the serial number of the data log are generated by the master server after receiving a first write instruction for the to-be-split slice sent by an agent node; the storage module 502 is further configured to store the data log and the serial number of the data log, and send a second acknowledgment message which includes the serial number of the data log to the master server after successful storage, so that the master server acquires and stores the to-be-written data according to the data log when the number of the received second acknowledgment messages is not less than a second threshold, and sends a second write instruction to each slave server; a writing module (not shown in the figure) is configured to acquire and store the to-be-written data according to the data log after receiving the second writing instruction which includes the serial number of the data log.

In one implementation, the receiving module 501 is further configured to receive an inquiry instruction sent by the master server; the device also includes a return module (not shown in the figure), which is configured to return the serial number of the log executed last time to the master server, so that the master server may determine that the splitting storage on the to-be-split slice has been performed in case that the serial number returned by each slave server last time is not less than the serial number of the splitting log.

It may be seen from the above that in the distributed table storage processing device provided by the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 6:
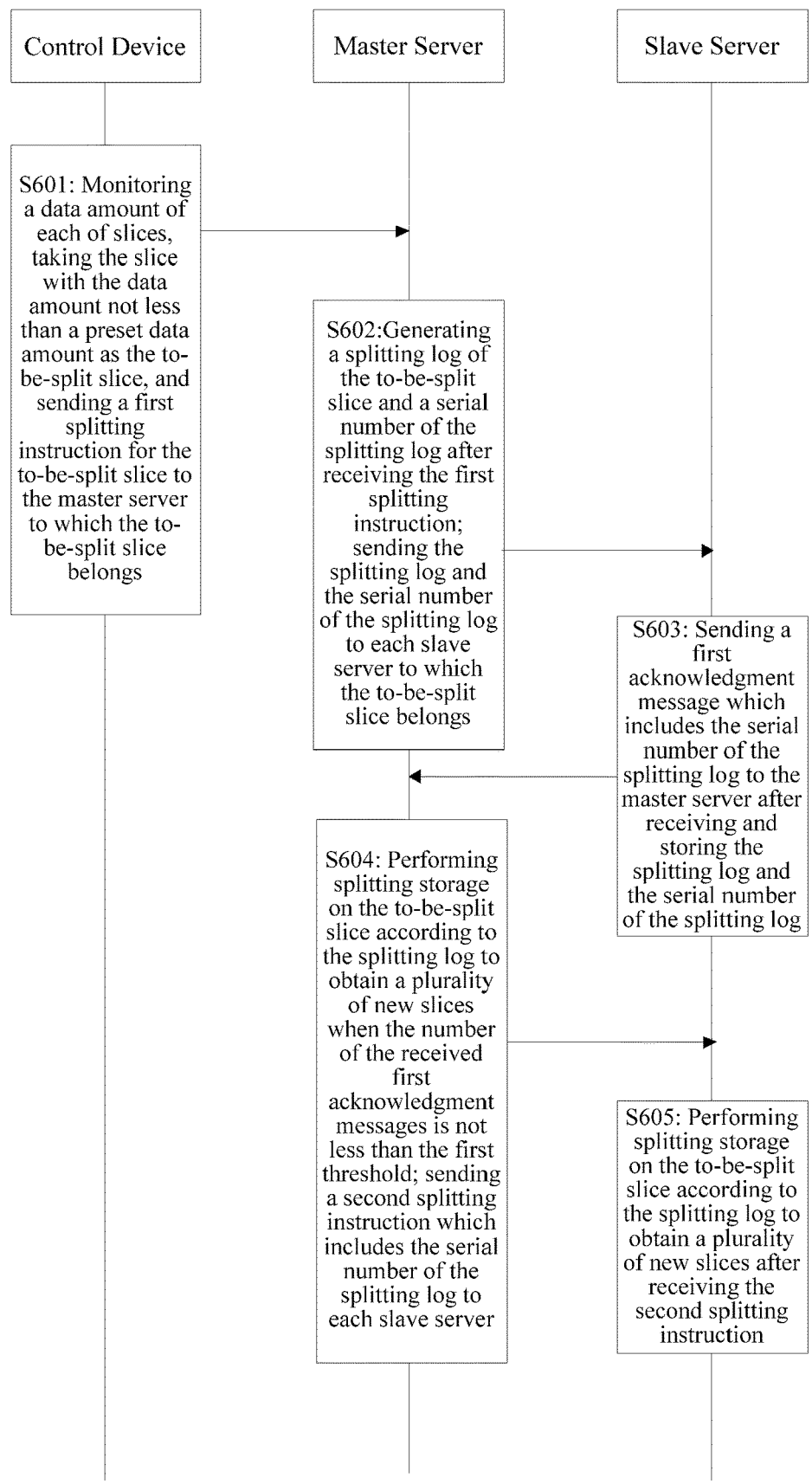
FIG. 6 is a timing diagram of a distributed table storage processing system provided by an embodiment of the present application.

The embodiment of the present application further provides a distributed table storage processing system, which is a sequence chart of the distributed table storage processing system as shown in FIG. 6, wherein: S601: the control device monitors a data amount of each of slices, takes the slice with the data amount not less than a preset data amount as the to-be-split slice, and sends a first splitting instruction for the to-be-split slice to the master server to which the to-be-split slice belongs; S602: the master server generates a splitting log of the to-be-split slice and a serial number of the splitting log after receiving the first splitting instruction; sends the splitting log and the serial number of the splitting log to each slave server to which the to-be-split slice belongs; S603: the slave server sends a first acknowledgment message which includes the serial number of the splitting log to the master server after receiving and storing the splitting log and the serial number of the splitting log; S604: the master server performs splitting storage on the to-be-split slice according to the splitting log to obtain a plurality of new slices when the number of the received first acknowledgment messages is not less than the first threshold; sends a second splitting instruction which includes the serial number of the splitting log to each slave server; S605: the slave server performs splitting storage on the to-be-split slice according to the splitting log to obtain a plurality of new slices after receiving the second splitting instruction.

In one implementation, the system further comprises: an agent device, which is configured to receive a first write instruction of a user for the to-be-split slice and send the first write instruction to a master server; the master server, which is further configured to generate the data log of the to-be-split slice and the serial number of the data log after receiving the first write instruction; send the data log and the serial number of the data log to each slave server; the slave server is further configured to send a second acknowledgment message which includes the serial number of the data log to the master server after storing the data log and the serial number of the data log; the master server is further configured to acquire and store to-be-written data according to the data log when the number of the received second acknowledgment messages is not less than a second threshold; send a second write instruction which comprises the serial number of the data log to each slave server; and the slave server is further configured to acquire and store the to-be-written data according to the data log after receiving the second write instruction.

In one implementation, the master server is further configured to send an inquiry instruction to each slave server; the slave server is further configured to return the serial number of the log last executed by the slave server to the master server after receiving the query instruction; the master server is further configured to receive the serial number returned by each slave server, and determine that the splitting storage on the to-be-split slice has been performed in case that the serial number returned by each slave server last time is not less than the serial number of the splitting log.

It may be seen from the above that in the distributed table storage processing system provided by the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

Figure 7:
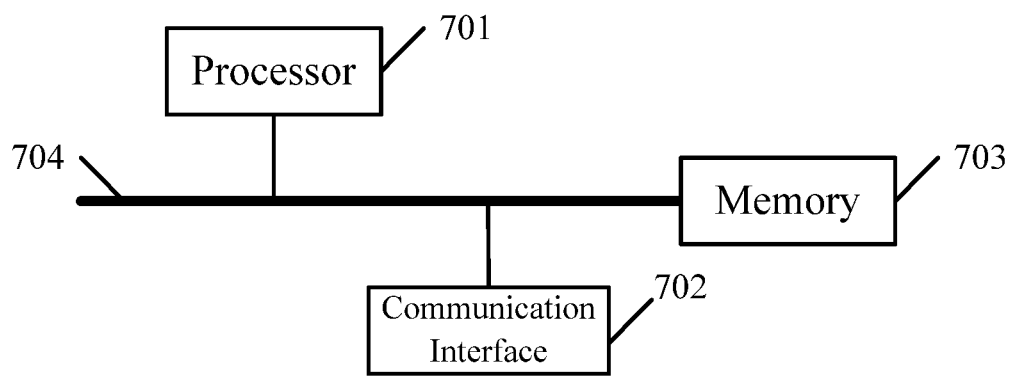
FIG. 7 is a schematic structural diagram of an electronic device provided by an embodiment of the present application.

The embodiment of the present application further provides an electronic device, as shown in FIG. 7, which comprises a processor 701, a communication interface 702, a memory 703 and a communication bus 704, wherein the processor 701, the communication interface 702 and the memory 703 communicate with each other through the communication bus 704, and the memory 703 is configured to store a computer program; the processor 701 is configured to execute the program stored on the memory 703. The program stored on the memory 703 may realize the following steps: after receiving the first splitting instruction for the to-be-split slice sent by the control device, generating the splitting log of the to-be-split slice and the serial number of the splitting log; sending the splitting log and the serial number of the splitting log to each slave server to which the to-be-split slice belongs, so that each slave server sends a first acknowledgment message which includes the serial number of the splitting log to the master server after storing the splitting log and the serial number of the splitting log; performing splitting storage on the to-be-split slice according to the splitting log to obtain a plurality of new slices when the number of the received first acknowledgment messages is not less than a first threshold; sending a second splitting instruction which includes the serial number of the splitting log to each slave server, so that each slave server performs splitting storage on the to-be-split slice according to the splitting log to obtain a plurality of new slices after receiving the second splitting instruction.

Alternatively, the program stored on the memory 703 may also realize the following steps: receiving the splitting log of the to-be-split slice and the serial number of the splitting log sent by the master server to which the to-be-split slice belongs, wherein the splitting log and the serial number of the splitting log are generated by the master server after receiving the first splitting instruction for the to-be-split slice sent by the control device; storing the splitting log and the serial number of the splitting log, and sending a first acknowledgment message which includes the serial number of the splitting log to the master server after successful storage, so that the master server performs splitting storage on to-be-split slice according to the splitting log to obtain a plurality of new slices when the number of the received first acknowledgment messages is not less than a first threshold, and sends a second splitting instruction to the slave server; performs splitting storage on the to-be-split slice according to the splitting log to obtain a plurality of new slices after receiving the second splitting instruction which includes the serial number of the splitting log.

It may be seen from the above that, in the electronic device provided by the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

The communication bus mentioned above in the electronic device may be Peripheral Component Interconnect (PCI) bus or Extended Industry Standard Architecture (EISA) bus, etc. The communication bus may be divided into address bus, data bus and control bus. For ease of presentation, only one thick line is shown in the figure, but which does not mean that there is only one bus or one type of bus.

The communication interface is used for communication between the electronic device and other devices. The memory may include Random Access Memory (RAM) or Non-Volatile Memory (NVM), such as at least one disk memory. Optionally, the memory may further be at least one storage device located far away from the above-mentioned processor.

The above-mentioned processor may be a general-purpose processor, including a Central Processing Unit (CPU), a Network Processor (NP), etc. it may also be a Digital Signal Processor (DSP), an Application Specific Integrated Circuit (ASIC), a Field-Programmable Gate Array (FPGA) or other prog-rammable logic devices, discrete gate or transistor logic devices, and discrete hardware components.

In yet another embodiment provided by the present application, there is also provided a computer readable storage medium, the computer readable storage medium stores instructions thereon, which, when running on a computer, cause the computer to execute the distributed table storage processing method in any of the above embodiments.

In yet another embodiment provided by the present application, there is also provided a computer program product containing instructions, which, when running on a computer, causes the computer to implement the distributed table storage processing method described in any of the above embodiments.

In the above embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, the flow or function according to the embodiment of the present application is generated in whole or in part. The computer may be a general-purpose computer, a special-purpose computer, a computer network, or other programmable devices. The computer instructions may be stored in a computer readable storage medium or transmitted from one computer readable storage medium to another, for example, the computer instructions may be transmitted from one website, computer, server or data center to another website, computer, server or data center through a wired manner (such as coaxial cable, optical fiber, digital subscriber line (DSL)) or a wireless manner (such as infrared, wireless, microwave, etc.). The computer readable storage medium may be any available medium that can be accessed by a computer, or data storage devices such as servers and data centers, etc. that contain one or more available medium integrations. The available media may be magnetic media (e.g., floppy disk, hard disk, magnetic tape), optical media (e.g., DVD), or semiconductor media (e.g., Solid State Disk (SSD)), etc.

It should be noted herein that, relational terms such as first and second are only used to distinguish one entity or operation from another entity or operation, and do not necessarily require or imply any such actual relationship or order between these entities or operations. Furthermore, the terms "include", "contain" or any other variation thereof are intended to cover non-exclusive inclusion, so that a process, method, article or equipment including a series of elements includes not only those elements, but also other elements which are not listed explicitly, or elements inherent to such process, method, article or equipment. Without more restrictions, the element defined by the sentence "including a . . . " does not exclude the existence of other identical elements in the process, method, article or equipment that includes the element.

All the embodiments in this specification are described in a related way, and the same or similar parts among the embodiments may be referred to each other, each embodiment focuses on the differences from other embodiments. In particular, for the device and system embodiments, since they are basically similar to the method embodiments, the description is relatively simple, please refer to the partial description of the method embodiments for relevant points.

The above are only preferred embodiments of the present application, and are not intended to limit the present application. Any modifications, equivalent replacement, improvements, etc. made within the spirit and principles of the present application shall be included in the scope of protection of the present application.

Industrial applicability: based on the above technical solutions provided by the embodiments of the present application, in case that both the master server and the slave server execute the same splitting log according to the sequence number, even if the master server and the slave server do not perform splitting storage on the to-be-split slice at the same time, the obtained new slices are the same, thus improving the availability of the distributed storage system.

What is claimed is:

1. A distributed table storage processing method, which is applied to a master server to which a to-be-split slice belongs, the method comprising:
generating a splitting log of the to-be-split slice and a serial number of the splitting log after receiving a first splitting instruction for the to-be-split slice sent by a control device;
sending the splitting log and the serial number of the splitting log to each slave server to which the to-be-split slice belongs, so that each slave server sends a first acknowledgment message which includes the serial number of the splitting log to the master server after storing the splitting log and the serial number of the splitting log;
performing splitting storage on the to-be-split slice according to the splitting log to obtain a plurality of new slices when the number of the received first acknowledgment messages is not less than a first threshold;
sending a second splitting instruction which includes the serial number of the splitting log to each slave server, so that each slave server performs splitting storage on the to-be-split slice according to the splitting log to obtain the plurality of new slices after receiving the second splitting instruction.

2. The method according to claim 1, wherein the method further comprises:
generating a data log of the to-be-split slice and a serial number of the data log after receiving a first write instruction for the to-be-split slice sent by an agent node;
sending the data log and the serial number of the data log to each slave server to which the to-be-split slice belongs, so that each slave server sends a second acknowledgment message which includes the serial number of the data log to the master server after storing the data log and the serial number of the data log;
acquiring and storing to-be-written data according to the data log when the number of the received second acknowledgment messages is not less than a second threshold;
sending a second write instruction which includes the serial number of the data log to each slave server, so that each slave server acquires and stores the to-be-written data according to the data log after receiving the second write instruction.

3. The method according to claim 2, wherein after sending a second splitting instruction to each slave server, the method further comprises:
sending an inquiry instruction to each slave server, so that each slave server returns a serial number of a log executed by the slave server last time after receiving the inquiry instruction;
receiving the serial number returned by each slave server, and determining that the splitting storage on the to-be-split slice has been performed in case that the serial number returned by each slave server last time is not less than the serial number of the splitting log.

4. An electronic device comprising a processor, a communication interface, a memory and a communication bus, wherein the processor, the communication interface and the memory communicate with each other through the communication bus;
the memory is configured to store a computer program; and
the processor is configured to implement method steps according to claim 1 when executing the program stored on the memory.

5. A non-transitory computer readable storage medium, the computer readable storage medium stores a computer program thereon which, when executed by a processor, causes the processor to implement method steps of claim 1.

6. A distributed table storage processing method, which is applied to a slave server to which a to-be-split slice belongs, the method comprising:
receiving a splitting log of the to-be-split slice and a serial number of the splitting log sent by a master server to which the to-be-split slice belongs, wherein the splitting log and the serial number of the splitting log are generated by the master server after receiving a first splitting instruction for the to-be-split slice sent by a control device;
storing the splitting log and the serial number of the splitting log, and sending a first acknowledgment message which includes the serial number of the splitting log to the master server after successful storage, so that the master server performs splitting storage on the to-be-split slice according to the splitting log to obtain a plurality of new slices when the number of the received first acknowledgment messages is not less than a first threshold, and sends a second splitting instruction to the slave server;
performing splitting storage on the to-be-split slice according to the splitting log to obtain the plurality of new slices after receiving the second splitting instruction which comprises the serial number of the splitting log.

7. The method according to claim 6, wherein the method further comprises:
receiving a data log of the to-be-split slice and a serial number of the data log sent by a master server to which the to-be-split slice belongs, wherein the data log and the serial number of the data log are generated by the master server after receiving a first write instruction for the to-be-split slice sent by an agent node;
storing the data log and the serial number of the data log, and sending a second acknowledgment message which includes the serial number of the data log to the master server after successful storage, so that the master server acquires and stores to-be-written data according to the data log when the number of the received second acknowledgment messages is not less than a second threshold, and sends a second write instruction to each slave server;
acquiring and storing the to-be-written data according to the data log after receiving the second write instruction which comprises the serial number of the data log.

8. The method according to claim 7, wherein the method further comprises:
receiving an inquiry instruction sent by the master server;
returning the serial number of the log executed last time to the master server, so that the master server determines that the splitting storage on the to-be-split slice has been performed in case that the serial number returned by each slave server last time is not less than the serial number of the splitting log.

9. A distributed table storage processing system, comprising:
a control device configured to monitor a data amount of each of slices, take a slice with the data amount not less than a preset data amount as a to-be-split slice, and send a first splitting instruction for the to-be-split slice to a master server to which the to-be-split slice belongs;

the master server is configured to generate a splitting log of the to-be-split slice and a serial number of the splitting log after receiving the first splitting instruction; send the splitting log and the serial number of the splitting log to each slave server to which the to-be-split slice belongs;

the slave server is configured to send a first acknowledgment message which includes the serial number of the splitting log to the master server after receiving and storing the splitting log and the serial number of the splitting log;

the master server is further configured to perform splitting storage on the to-be-split slice according to the splitting log to obtain a plurality of new slices when the number of the received first acknowledgment messages is not less than a first threshold; send a second splitting instruction which includes the serial number of the splitting log to each slave server; and the slave server is further configured to perform splitting storage on the to-be-split slice according to the splitting log to obtain the plurality of new slices after receiving the second splitting instruction.

10. The system according to claim 9, wherein the system further comprises:

an agent device, configured to receive a first write instruction of a user for the to-be-split slice and send the first write instruction to the master server;

the master server is further configured to generate a data log of the to-be-split slice and a serial number of the data log after receiving the first write instruction; sending the data log and the serial number of the data log to each slave server;

the slave server is further configured to send a second acknowledgment message which includes the serial number of the data log to the master server after storing the data log and the serial number of the data log;

the master server is further configured to acquire and store to-be-written data according to the data log when the number of the received second acknowledgment messages is not less than a second threshold; sending a second write instruction which includes the serial number of the data log to each slave server;

the slave server further is configured to acquire and store the to-be-written data according to the data log after receiving the second write instruction.

11. The system according to claim 10, wherein, the master server is further configured to send an inquiry instruction to each slave server;

the slave server is further configured to return the serial number of the log executed by the slave server last time to the master server after receiving the query instruction;

the master server is further configured to receive the serial number returned by each slave server, and determine that the splitting storage on the to-be-split slice has been performed in case that the serial number returned by each slave server last time is not less than the serial number of the splitting log.

* * * * *